US011251901B2

(12) United States Patent
Alpert et al.

(10) Patent No.: US 11,251,901 B2
(45) Date of Patent: Feb. 15, 2022

(54) FEEDBACK PARAMETERS REQUIRED BY LINK ADAPTATION

(71) Applicant: Intel Corporation, Santa Clara, CA (US)

(72) Inventors: Yaron Alpert, Hod Hasharoni (IL); Qinghua Li, San Ramon, CA (US); Chittabrata Ghosh, Fremont, CA (US); Feng Jiang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/461,692

(22) PCT Filed: Nov. 17, 2017

(86) PCT No.: PCT/US2017/062305
§ 371 (c)(1),
(2) Date: May 16, 2019

(87) PCT Pub. No.: WO2018/094214
PCT Pub. Date: May 24, 2018

(65) Prior Publication Data
US 2019/0356410 A1    Nov. 21, 2019

Related U.S. Application Data

(60) Provisional application No. 62/424,232, filed on Nov. 18, 2016.

(51) Int. Cl.
*H04W 72/02* (2009.01)
*H04L 27/26* (2006.01)
(Continued)

(52) U.S. Cl.
CPC ......... *H04L 1/0025* (2013.01); *H04B 17/102* (2015.01); *H04L 1/0003* (2013.01);
(Continued)

(58) Field of Classification Search
CPC ....... H04L 1/0003; H04L 1/04; H04L 1/0028; H04L 27/206; H04L 27/2613; H04W 52/365; H04W 52/367; H04W 72/02
See application file for complete search history.

(56) References Cited

U.S. PATENT DOCUMENTS

2002/0141375 A1   10/2002  Choi
2015/0282043 A1   10/2015  Fang et al.
(Continued)

FOREIGN PATENT DOCUMENTS

KR     1020090063049 A    6/2009
WO     WO-2018094214 A1   5/2018

OTHER PUBLICATIONS

IEEE 802.11 Spec-Framework, Robert Stacey (Year: 2015).*
(Continued)

*Primary Examiner* — Un C Cho
*Assistant Examiner* — Peter K Mak
(74) *Attorney, Agent, or Firm* — Schwegman Lundberg & Woessner, P.A.

(57) ABSTRACT

Disclosed are methods, devices, and computer readable storage mediums for encoding and decoding messages for fast link adaptation. In one aspect, a method of a high efficiency (HE) station (STA) (HE STA) includes encoding an aggregated control subfield of a high throughput (HT) Control field to signal one or more of: a request to use dual carrier modulation (DCM), a request to use a particular resource unit, an uplink (UL) power headroom indication, and an indication that the HE STA is using a minimum transmit power for a current modulation and coding scheme (MCS). The method also includes configuring the HE STA to transmit a HE-PPDU including the HT control field.

4 Claims, 13 Drawing Sheets

(51) Int. Cl.
*H04W 52/36* (2009.01)
*H04W 84/12* (2009.01)
*H04L 1/00* (2006.01)
*H04B 17/10* (2015.01)
*H04L 1/04* (2006.01)
*H04L 27/20* (2006.01)

(52) U.S. Cl.
CPC .............. *H04L 1/0028* (2013.01); *H04L 1/04* (2013.01); *H04L 27/206* (2013.01); *H04L 27/2613* (2013.01); *H04W 52/365* (2013.01); *H04W 52/367* (2013.01); *H04W 84/12* (2013.01)

(56) References Cited

U.S. PATENT DOCUMENTS

| | | | |
|---|---|---|---|
| 2016/0065467 A1 | 3/2016 | Wu et al. | |
| 2016/0323426 A1* | 11/2016 | Hedayat | H04W 28/0268 |
| 2016/0353485 A1* | 12/2016 | Wentink | H04W 72/14 |
| 2017/0070914 A1* | 3/2017 | Chun | H04W 28/10 |
| 2017/0099219 A1* | 4/2017 | Lee | H04W 28/02 |
| 2017/0126384 A1* | 5/2017 | Noh | H04L 1/16 |
| 2017/0127404 A1* | 5/2017 | Merlin | H04W 72/1289 |
| 2017/0181187 A1* | 6/2017 | Asterjadhi | H04W 74/006 |
| 2017/0188368 A1* | 6/2017 | Cariou | H04L 61/6022 |
| 2017/0310424 A1* | 10/2017 | Chun | H04L 1/16 |
| 2017/0373808 A1* | 12/2017 | Park | H04L 5/005 |
| 2018/0020460 A1* | 1/2018 | Hedayat | H04W 52/00 |
| 2018/0132109 A1* | 5/2018 | Lim | H04W 72/1205 |
| 2018/0249503 A1* | 8/2018 | Kim | H04W 74/0816 |
| 2018/0368118 A1* | 12/2018 | Hsu | H04W 72/042 |
| 2019/0115999 A1* | 4/2019 | Sundman | H04L 1/0025 |
| 2019/0124638 A1* | 4/2019 | Lim | H04L 27/2602 |
| 2019/0246312 A1* | 8/2019 | Kim | H04W 52/365 |

OTHER PUBLICATIONS

"International Application Serial No. PCT/US2017/062305, International Search Report dated Mar. 15, 2018", 3 pgs.
"International Application Serial No. PCT/US2017/062305, Written Opinion dated Mar. 15, 2018", 9 pgs.

* cited by examiner

FEEDBACK PARAMETERS REQUIRED BY LINK ADAPTATION

CROSS REFERENCE TO RELATED APPLICATIONS

This application is a U.S. National Stage Filing under 35 U.S.C. 371 from International Application No. PCT/US2017/062305, filed on Nov. 17, 2017, and published as WO 2018/094214 on May 24, 2018, which claims priority to U.S. Provisional Application No. 62/424,232, filed Nov. 18, 2016, and entitled "FEEDBACK PARAMETERS REQUIRED BY LINK ADAPTATION." The contents of these prior applications are considered part of this application, and are hereby incorporated by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for feedback parameters required by link adaptation.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
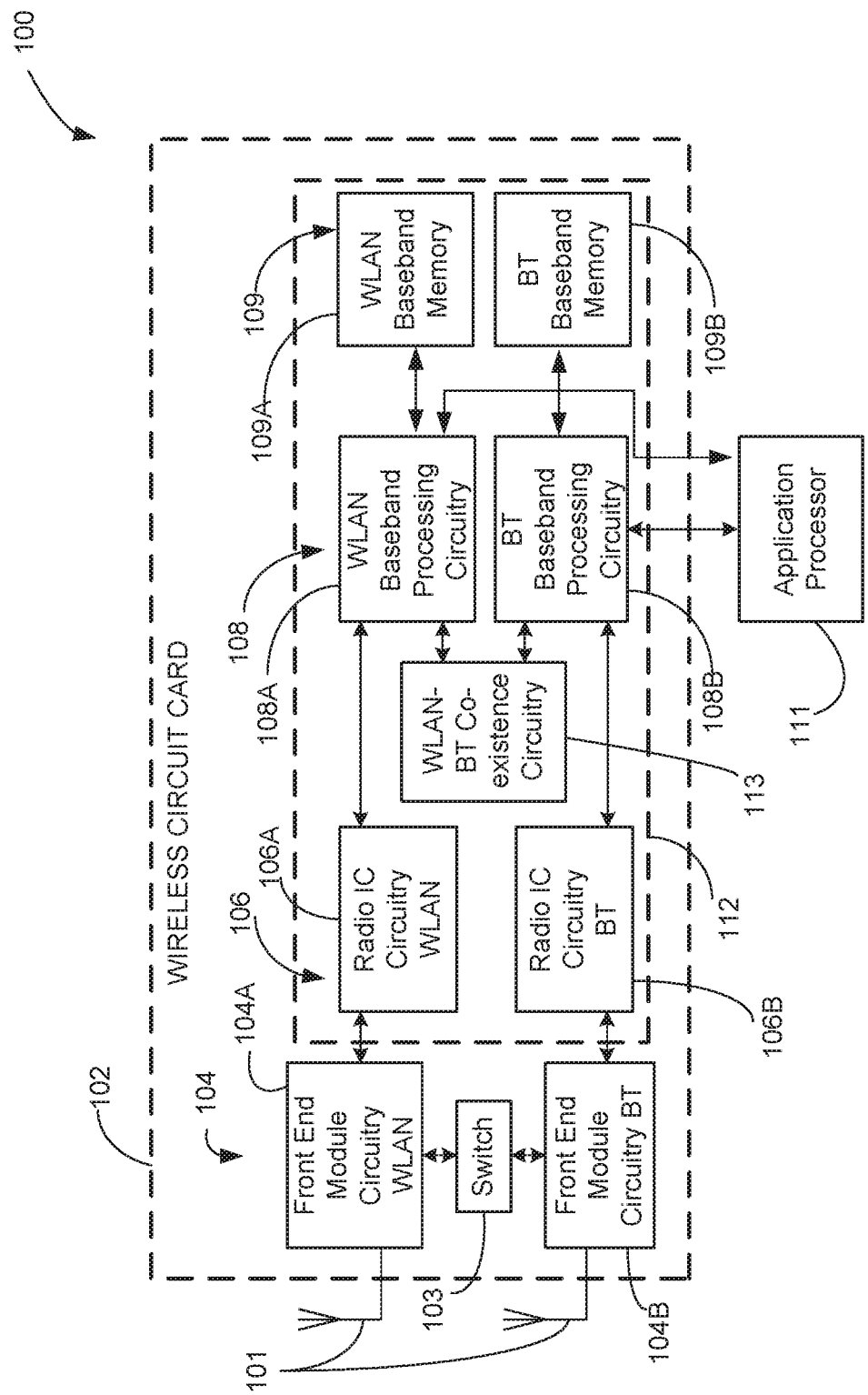
FIG. 1 illustrates a WLAN in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments of a Fast link adaptation are currently part of the IEEE802.11 standard baseline. Such embodiments of fast link adaptation are useful for combating rapid changes in channel quality. For example, the interference from a microwave oven may in some embodiments suddenly degrade channel quality. In these cases, the transmitter may in some embodiments need to react accordingly and in timely manner to send packets to the receiver efficiently. For example, the MCS may in some embodiments need to be reduced dramatically. This is in some embodiments referred to as link adaptation. For enabling the fast link adaptation, the receiver needs in some embodiments to feedback the channel quality in a timely manner.

The next version of the IEEE 802.11 may in some embodiments address new challenges and functionalities including, for example, AP based UL link adaptation, new modulation schism (DCM), new long rage operation mode, new preamble puncturing mode/CCA detection methods, and new UL power control. Therefore, the IEEE 802.11 standard baseline may in some embodiments be modified to support these functionalities. For 802.11ax, embodiments relating to the feedback for the fast link adaptation have not been decided.

Existing signaling for IEEE 802.11a/n/ac may not in some embodiments support new modes under IEEE 802.11ax. Disclosed here are embodiments for signaling embodiments to support UL and DL feedback from and to STAs. For example, in some embodiments, new signaling can include one or more signaling of feedback direction (UL/DL), signaling of a proposed MCS and a number of spatial streams (NSS), (this may include support for new IEEE 802.11ax modulation schemes such as dual carrier modulation (DCM)), signaling of preferred operation modes (e.g., regular or new IEEE 802.11ax long rage operation mode), signaling of interference conditions (e.g. CCA indication per operational 20 MHz, and/or signaling of recommended UL power control parameters (e.g. power headroom).

In some cases, the PHY layer of IEEE 802.11ax embodiments can have more MCS variants than the PHY layer of legacy IEEE 802.11a/n/ac embodiments. Therefore, more PHY parameters need to be fed back in IEEE 802.11ax embodiments. For example, embodiments of DCM, extended range mode, preamble puncturing mode, and transmit power headroom may be new to IEEE 802.11ac. Because the legacy feedback format may not include parameters for such embodiments, new parameters may be added in accordance with embodiments described herein. Embodiments of existing feedback formats can be for IEEE 802.11n/ac, which may not include the new IEEE 802.11ax MCS formats. Embodiments described herein may add parameters to the feedback such that the new MCSs and features can be utilized.

Figure 2:
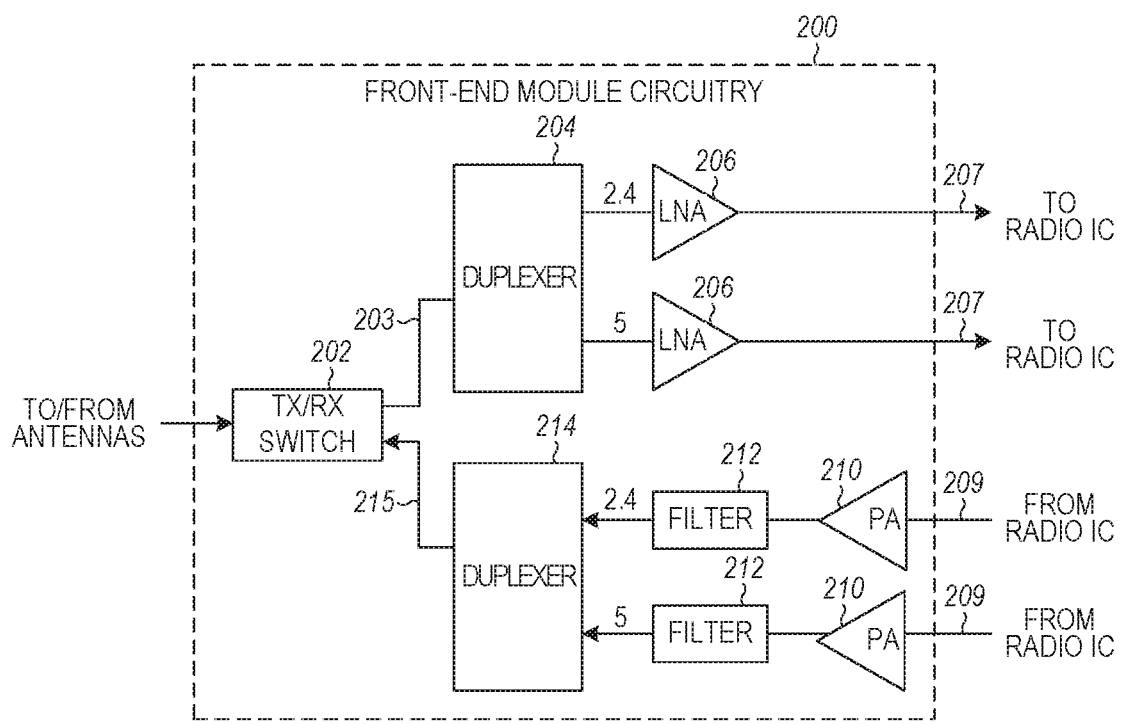
FIG. 2 illustrates solicited feedback and unsolicited feedback in accordance with some embodiments.

Embodiments described herein can extend the IEEE 802.11 standard bassline link adaptation feedback signaling. Such new signaling embodiments can support UL and DL feedback. Embodiments described herein can support the following two types of IEEE 802.11ax link adaptation feedbacks, solicited and unsolicited, as illustrated in FIG. 2. The link adaptation feedback can in some embodiments be contained in the MAC, for example, in different variants of HT Control field (HTC).

In addition to the legacy IEEE 802.11a/n/ac, embodiments relating to IEEE 802.11ax that may be under development can introduce new PHY transmission modes, where some embodiments may require new feedback parameters for the link adaptation.

For example, in some aspects, dual carrier modulation (DCM) indications are proposed. Dual carrier modulation provides for data bits to be transmitted twice on two different sets of tones. This may improve reliability, especially in the presence of interference and/or fading. In some aspects, a station may recommend or request an access point to utilize DCM for transmissions between the access point and the station. The station may make a recommendation to utilize DCM if, for example, the station detects an amount of interference above a threshold in the communication path between the access point and the station.

In some aspects, an extended range indication are proposed. In some aspects, the indication may be one or two bits long. In extended range mode, an HE-SIG-A field in a preamble can be sent twice with different interleavers. Thus, a reliability of a preamble including the HE-SIG-A field can be enhanced. In some of these aspects, there may be two options for data tone allocation. A first option may use a full 20 MHz, i.e. 242-tone RU. A second option may use a single 106-tone RU. In some aspects, use of a single 106-tone RU can include a boosted transmission power and DCM for range extension.

In some aspects using extended range mode, L-STF fields and one or more L-LTF fields may have transmission power that is boosted. For example, in some aspects, the power may be boosted by 3 dB. In extended range mode, a HE-SIG-A field may be repeated. Therefore, a preamble portion of a frame may be enhanced. The bandwidth of data portion of the frame may uses either 242 tones or 106 tone resource units. One bit may be used to indicate the bandwidth and one bit may be used to indicate the extended range mode. The 106-tone RU can enhance the reliability at the cost of data rate.

In some aspects, multi-user preamble puncturing indications may be implemented. In such embodiments, one or multiple 20 MHz sub-channels within an 80 MHz, or 80+80 MHz, or 160 MHz channel may not be utilized. For example, these channels may be subject to interference, and are thus avoided to improve reliability.

Some aspects provide for a power headroom indication. The power headroom indication(s) may be utilized to improve a near-far problem in multiuser uplink transmissions. In some embodiments, a station may indicate to an access point how much more power the STA can provide before hitting a power limit of the station. In some embodiments, the STA may tell the AP that the STA is already using the minimum power for sending the assigned MCS.

Some aspects may provide for an indication of a sub-band (or sub-channel) that has desirable or undesirable signal characteristics. These one or more indications may indicate frequency sub-bands or sub-channels that are favored or disfavored for transmissions. This provides flexibility to a transmission scheduler. For example, a multi-user transmission may schedule transmissions to a device indicating favorable channel conditions on the indicated channel. Disfavored channels may not be scheduled for a multi-user transmission to the device transmitting the indication of the disfavored sub band or sub-channel.

Some aspects may provide for a power headroom indication. In some aspects, an access point may consider an amount of power headroom available to a station when scheduling an uplink multi-user transmission including the station. For example, the STA can detect a sudden degradation in the downlink channel and assume the reciprocity in the uplink. The STA can use the feedback mechanism for fast link adaption. Besides recommending a MCS, the station may also indicate to the access point how much more power the station can send for the recommended MCS over a normalized 20 MHz bandwidth. Provided with such a power headroom indication, the AP may schedule the uplink more efficiently e.g. via user grouping and MCS selection.

Figure 8:
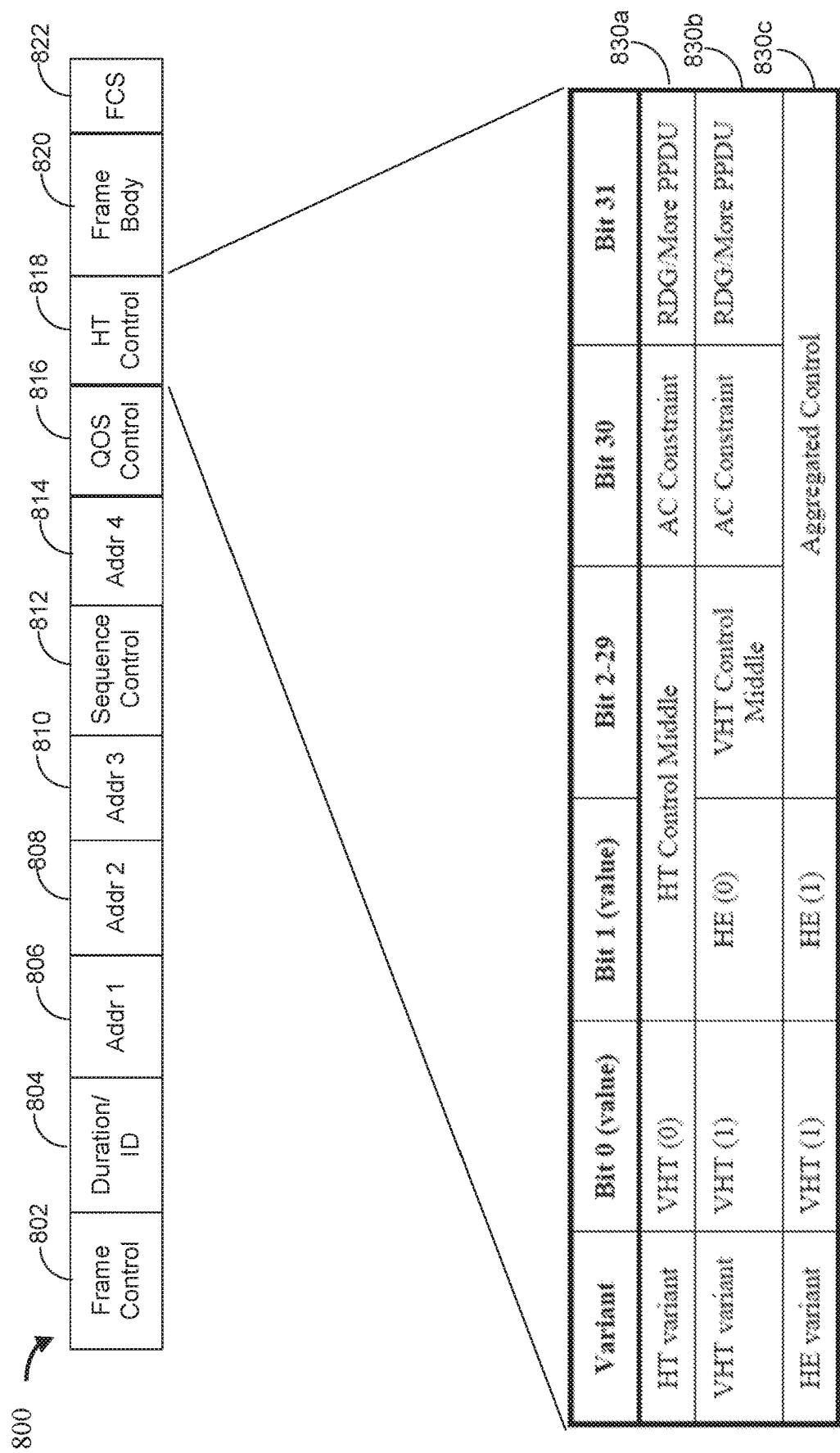
FIG. 8 shows an example frame in accordance with at least some embodiments of this disclosure.

Embodiments described herein can include some or all of these parameters in a feedback for the fast link adaption message, for example, in an HT Control field of the message. An example of a HT control field with HE variant is shown in FIG. 8, discussed below. In some aspects, feedback parameters may in an Aggregated Control subfield (A-Control), also discussed below.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106. In some embodiments, such as the embodiment shown in FIG. 1, the wireless radio card 102 may include separate baseband memory for one or more of the WLAN baseband processing circuitry 108A and Bluetooth baseband processing circuity 108B, shown as baseband memories 109A and 109B respectively.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BI functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexes 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
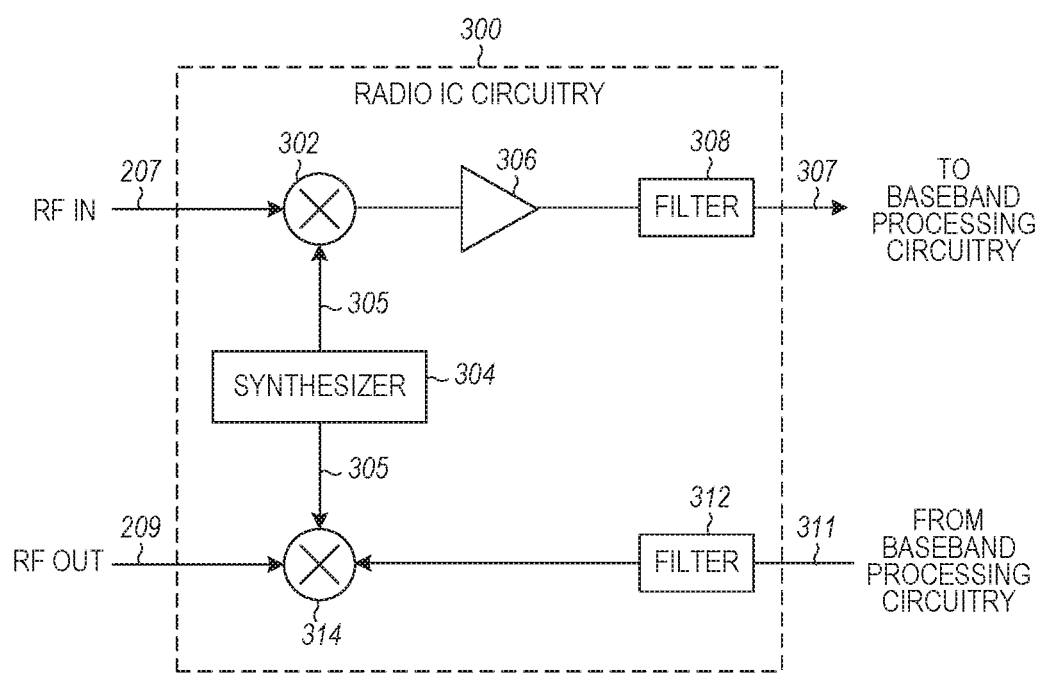
FIG. 3 illustrates high throughput (HT) control field with high efficiency (HE) variant in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
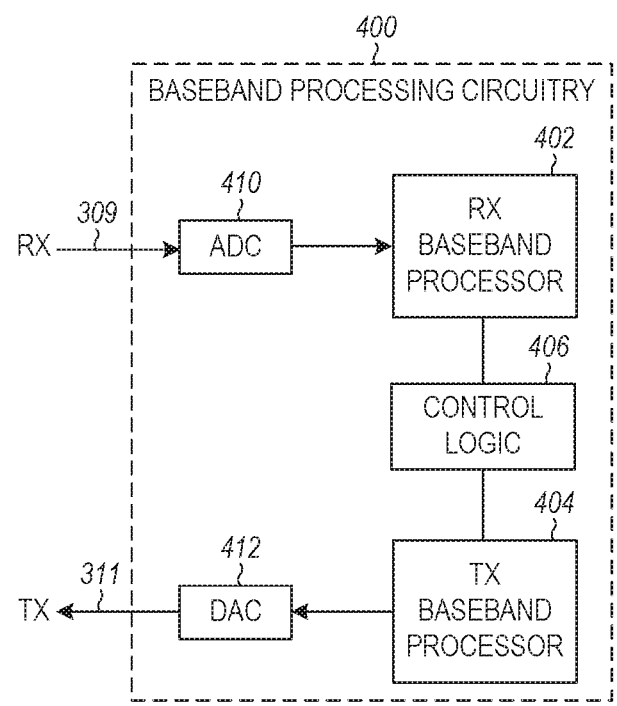
FIG. 4 illustrates preamble puncturing for HE-SIG-A in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
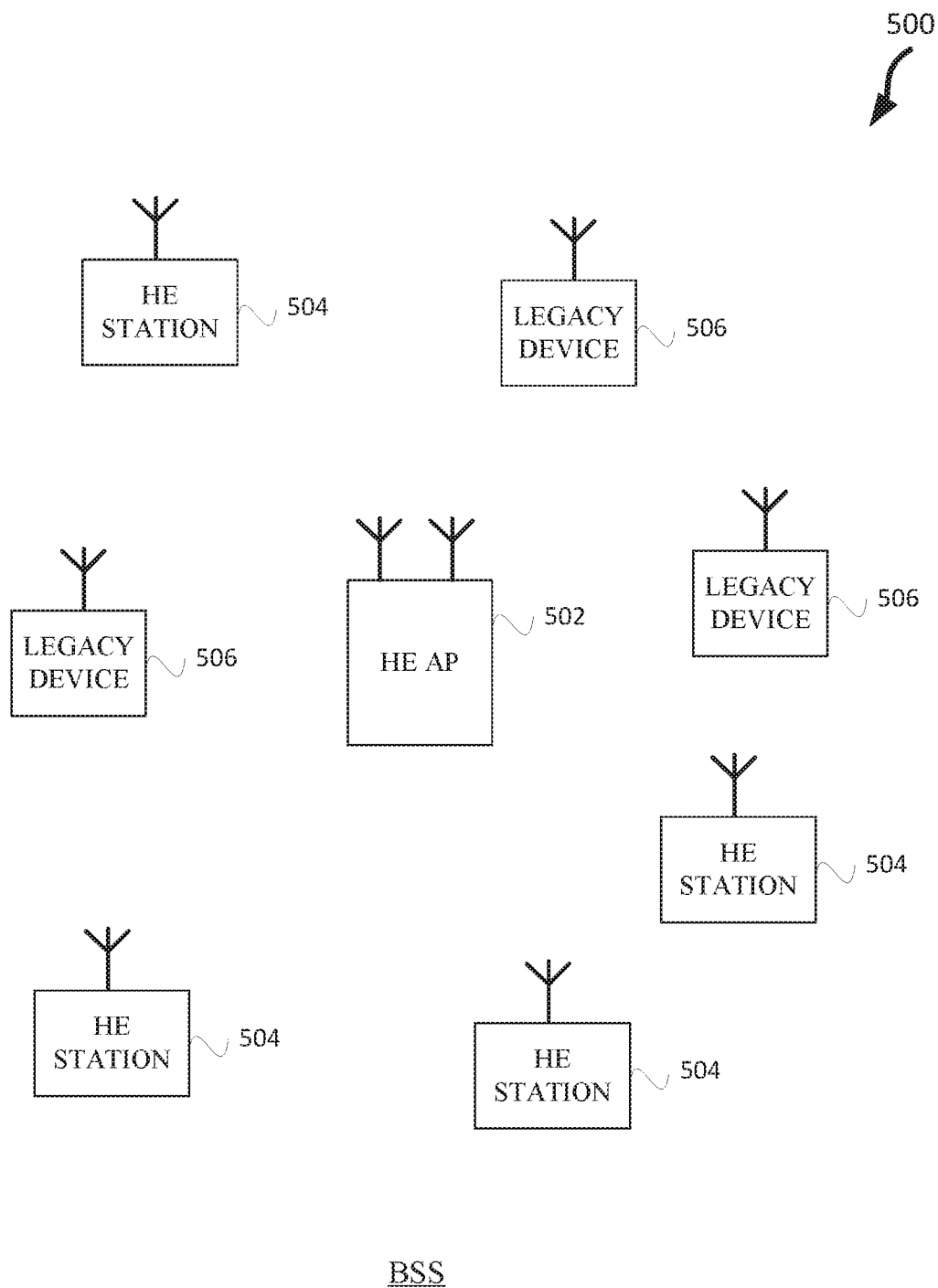
FIG. 5 illustrates a wireless LAN (WLAN) accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAB 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160-MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz.

In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of a bandwidth or a number of tones or subcarriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (e.g., Worldwide interoperability for Microwave Access (WiMAX)), BlueTooth®, or other technologies.

Some embodiments relate to HE communications. In accordance with some IEEE 802.11 embodiments, e.g., IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TROP and sub-channel information. During the HE control period. HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAB 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP.

In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502, in example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502, in example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the FIE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-13.

In example embodiments, the HE station 504 and/or the HE AP 502 are configured to perform the methods and operations/functions described herein in conjunction with FIGS. 1-13. In example embodiments, an apparatus of the HE station 504 and/or an apparatus of the HE AP 502 are configured to perform the methods and functions described herein in conjunction with FIGS. 1-13. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
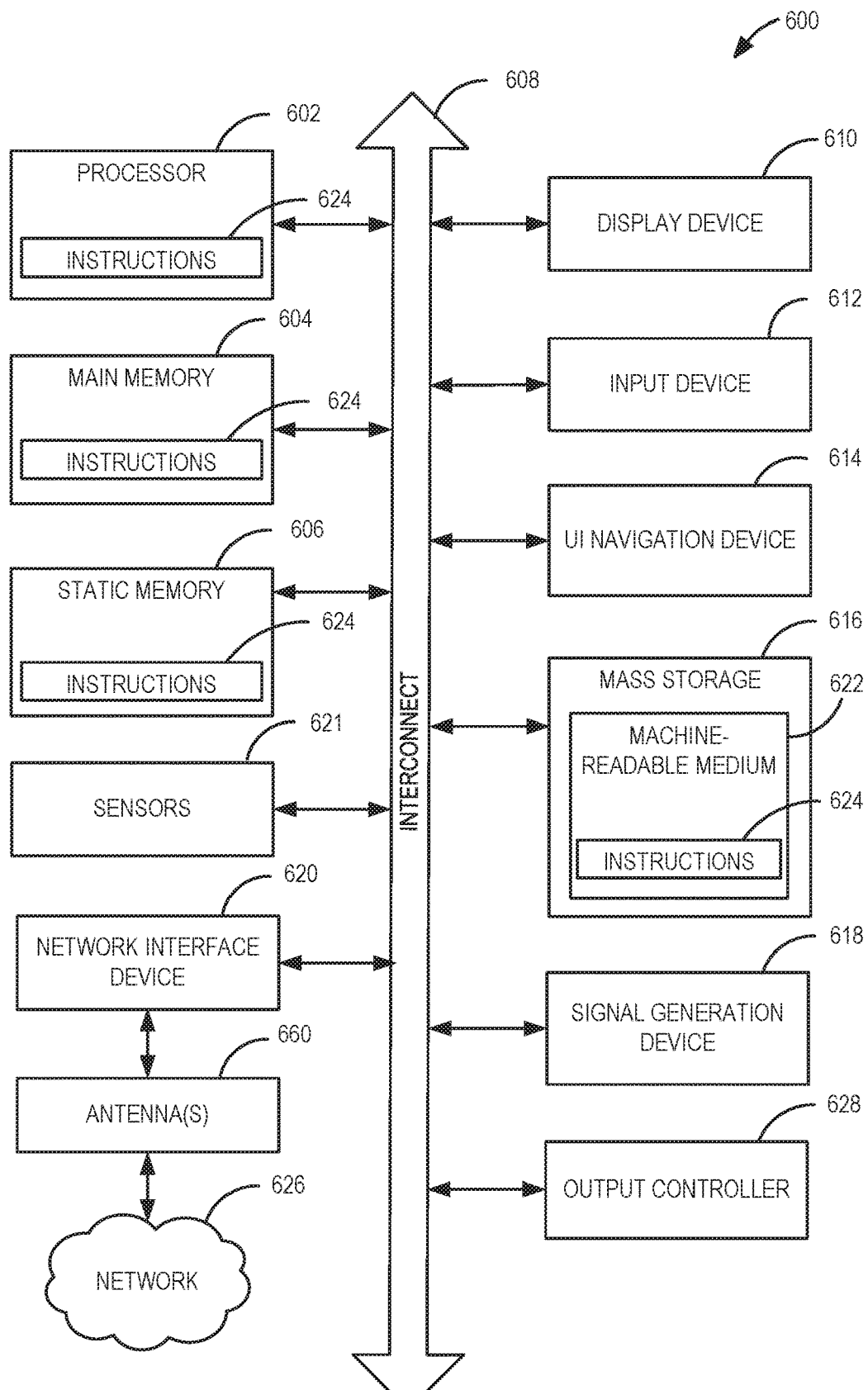
FIG. 6 illustrates a block diagram of an example machine 600 upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
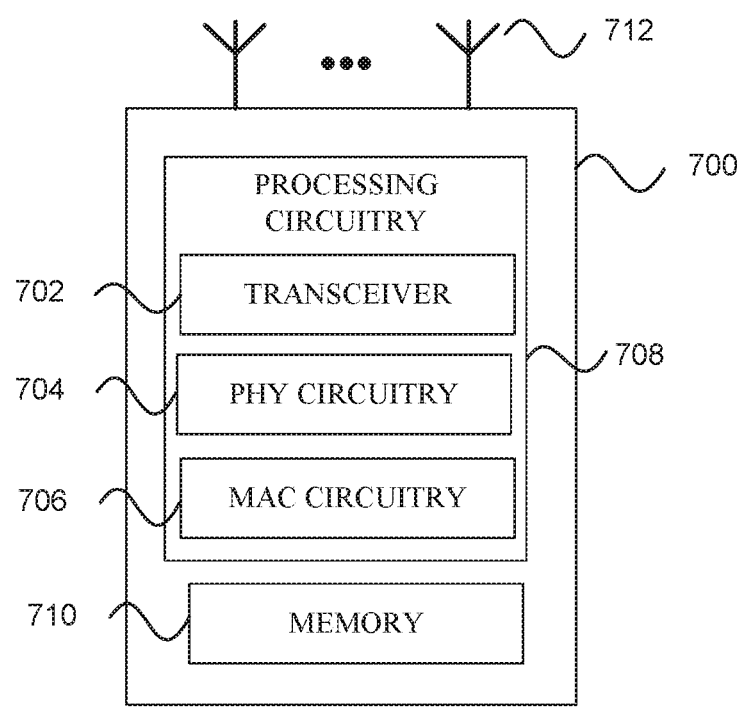
FIG. 7 illustrates a block diagram of an example wireless device 700 upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6, in some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or FIE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general-purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

FIG. 8 shows an example frame consistent with at least some embodiments of this disclosure. The example frame 800 includes a frame control field 802, duration/ID field 804, an address one (1) field 806, address two (2) field 808, an address three (3) field 810, a sequence control field 812, an address four (4) field 814, a QOS control field 818, a high throughput control field 818, a frame body 820, and a frame check sequence 822. The HT Control field 818 may be formatted according to at least three formats 830a-c. Which of the three formats is used for a particular frame may be indicated by Bit 0 and Bit 1, as shown in FIG. 8. In some aspects, if bit zero (0) has a value of one (1), and bit one (1) has a value of one (1), the remaining bits 2-31 form an aggregated control field 832.

Figure 9:
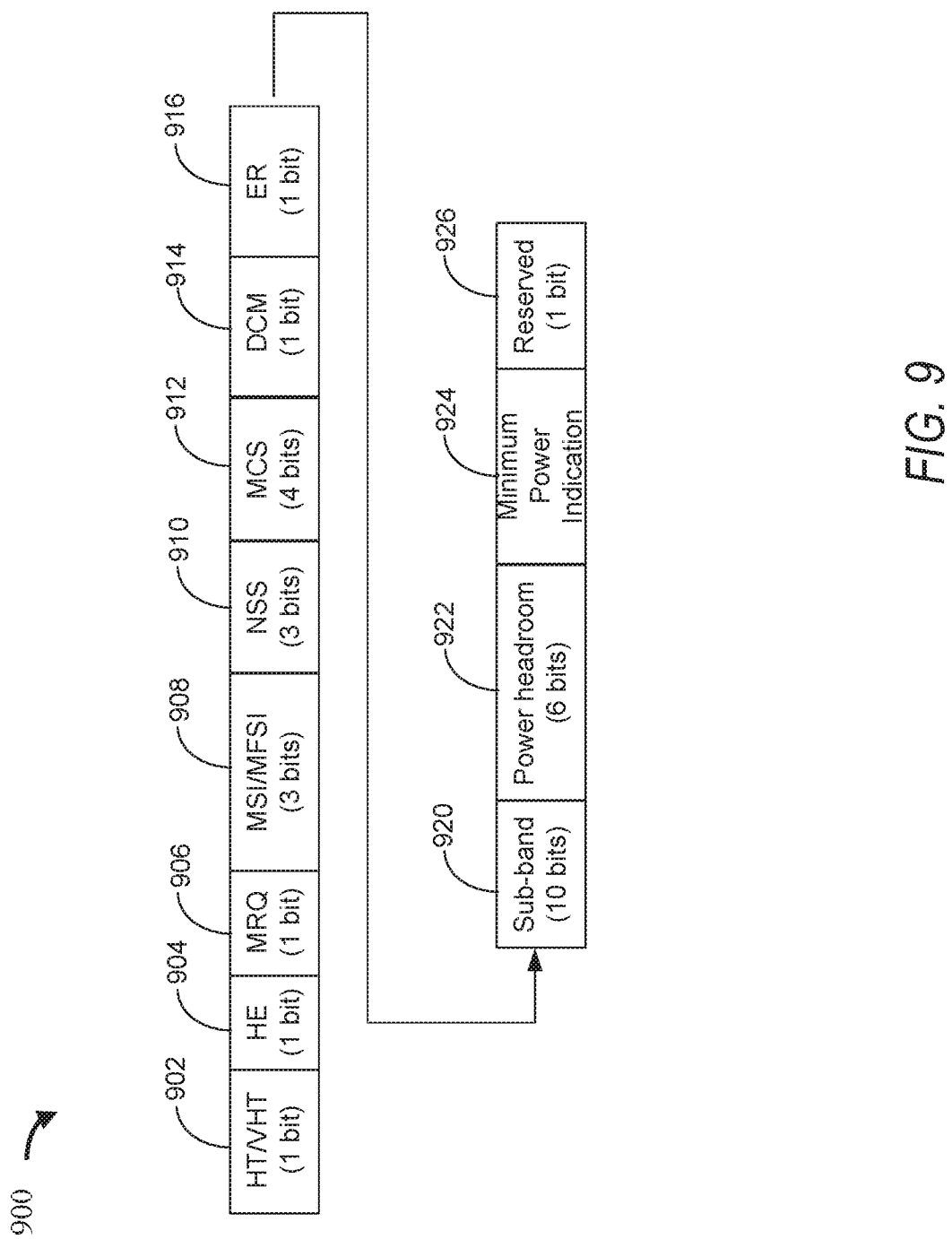
FIG. 9 shows an example embodiment of a feedback format using a HT-Control field, such as the HT control field.

FIG. 9 shows an example embodiment of a feedback format using an HT-Control field, such as the HT control field. FIG. 9 shows a frame 900 including an HT/VHT indication 902, an HE indication 904, an MRQ indication 906, an MSI/MFSI field 908, a number of spatial streams field 910, a modulation and coding scheme field 912, a dual carrier modulation field 914, an extended range (ER) field 916, a sub-band field 920, a power headroom field 922, a minimum transmit power indication 924, and a reserved field 926. The HT/VHT indication field 902 indicates whether the HT-Control field may be for high throughput (HT) or Very High Throughput (VHT)/High Efficiency (HE). The HE indication 904 indicates whether the HT-Control field is for a high efficiency frame. When the HT/VHT field 902 indicates VHT, and the HE field 904 indicates HE, the HT-Control field is for HE. The MRQ field 906 indicates whether the HT-Control field is used for a feedback request or a feedback. The MSI/MFSI field 908 includes a sequence number of the feedback request or feedback. When a value of a sequence number included in the MSI/MFSI field is equal to seven (7), the feedback may be an unsolicited feedback. The number of spatial streams (NSS) field 910 indicates a recommended number of spatial streams for the data transmission requested by a transmitting device of this HT control field. The modulation and coding scheme field 912 indicates a recommended modulation coding scheme requested by the transmitter of this HT control field. The dual carrier modulation field 914 indicates whether DCM is used for the feedback MCS. The extended range (ER) field 916 indicates whether range extension mode is used for the feedback MCS. The number of spatial streams field 910, the modulation and coding scheme field 912, the dual carrier modulation field 914, and the extended range field 916 may be indexed jointly or individually. When indexed jointly, these implementations save 1-2 indication bits when compared to implementations that index individually. The sub-band field 920 indicates either a desirable or unfavorable sub-band or sub-channel. In some aspects, the sub-band field 920 may be an indication of a frequency sub-band (or subchannel) has been determined to have favorable or unfavorable characteristics. This information may provide flexibility to a device receiving the sub-band field 920 when scheduling a multi-user transmission. For example, a device transmitting a multi-user transmission may schedule transmissions to a device transmitting the sub-band field 920 on an indicated channel having favorable characteristics, or avoid scheduling a transmission to the transmitter of the field 920 on an indicated unfavorable channel. This may reduce co-channel (or OSS) interference in some aspects.

In some aspects, the sub-band field 920 may indicate a resource unit that has either favorable or unfavorable characteristics. In some aspects, a sub-channel may be indicated instead of the resource unit, as the sub-channel may require fewer bits to indicate. For example, the sub-channel may be indicated via three (3) bits. For example, the three bits may indicate one of eight indexes, one indexes for each 20 Mhz subchannel in a 160 Mhz total channel bandwidth implementation. In some aspects, the sub-band indication may utilize four bits. A first bit may indicate whether the remaining bits signal favorable or unfavorable channels. The next three bits may indicate an index of the channel, as described above. In other aspects, a different total number of bits may be utilized to signal favorable and/or unfavorable channels or sub-channels.

In some aspects, wideband interference may be at least partially due to transmissions from outside a basic service set (OBSS transmissions). Some aspects may reuse bits allocated for preamble puncturing or channel bundling to instead indicate channels with favorable or unfavorable characteristics as described above.

The power headroom field 922 is a transmit power headroom for an uplink transmission. The minimum power indication field 924 may indicate that the device transmitting the HT control field 900 is already using the minimum power for sending an assigned MCS. The minimum power indication 924 indicates whether a device transmitting the HT control field 900 is using a minimum transmission power for sending the assigned MCS. The reserved field 926 is reserved for future use.

In some embodiments, the fields can be in a different configuration or order. For example, in some embodiments the reserved field 926 can be immediately following the FIE field 904. In some aspects, a one (1)-bit field for unsolicited feedback field may be added in some embodiments.

Some other parameters, which may be fed back, can be included in the HT control field 900 in some embodiments. For example, in some embodiments, a subset of antennas (e.g., antenna selections) may be fed back and indicated by one or more fields in the HT control field 900. In some embodiments, an adjacent channel interference (ACI) indication or an aggregate interference in the primary 20 MHz channel may be fed back and included in the HT control field 900. Such embodiments can indicate to an access point an amount of OBSS interference experienced by an STA sending the feedback (i.e. MFB).

Figure 10:
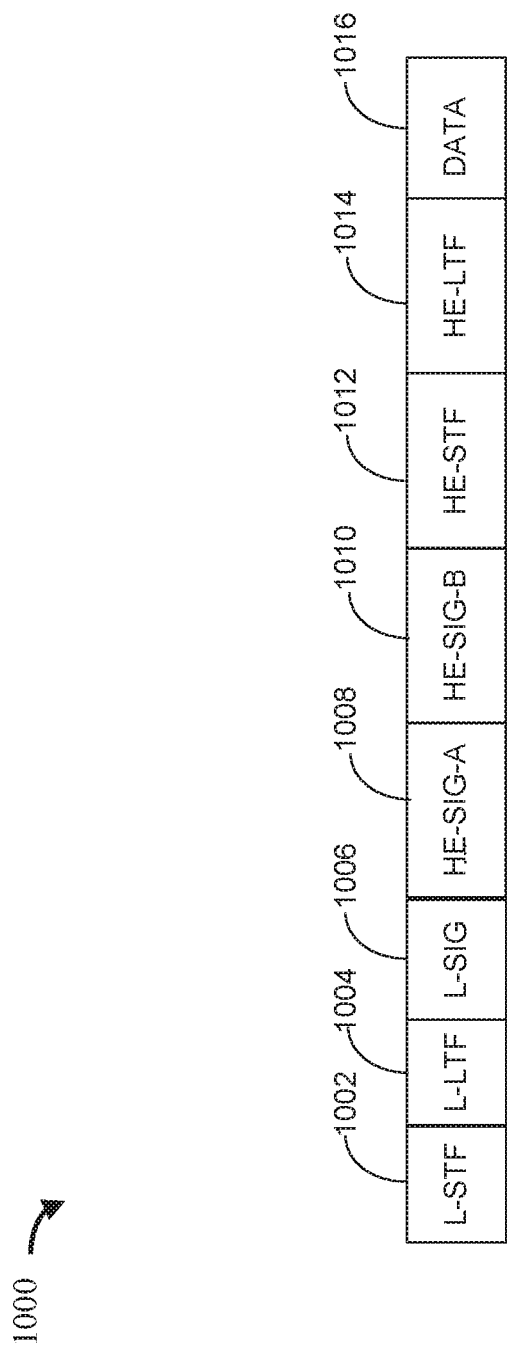
FIG. 10 shows portions of a physical layer convergence protocol (PLCP) preamble.

FIG. 10 shows portions of a physical layer convergence protocol (PLCP) preamble. The illustrated preamble 1000 includes a legacy short training field 1002, a legacy long training field 1004, a legacy signal field 1006, a high efficiency signal A field 1008, a high efficiency signal B field 1010, a high efficiency short training field 1012, a high efficiency long training field 1014, and data 1016. In some aspects, the data 1016 may include at least the frame 800, discussed above with respect to FIG. 8. In some aspects, the HE-SIG-A field 1008 may indicate the favored or disfavored channel or sub-channel, instead of, as discussed above, the field 920. For example, in some aspects, bits 15-17 of the HE-SIGA field 1008 may indicate the sub-channel or channel.

Figure 11:
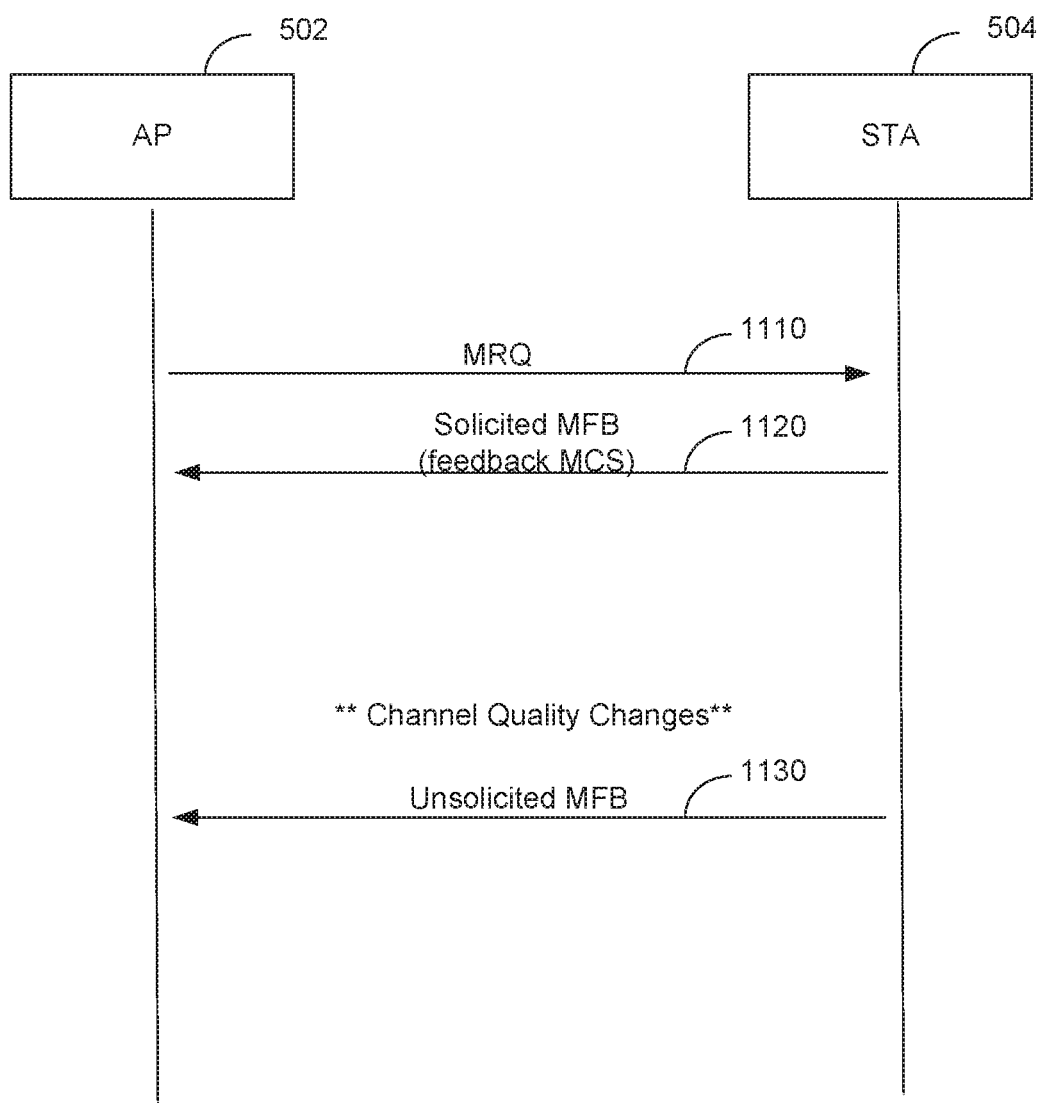
FIG. 11 is a message sequence diagram showing a difference between solicited fast link adaptation feedback response frames and unsolicited fast link adaptation feedback response frames.

FIG. 11 is a message sequence diagram showing a difference between solicited fast link adaptation feedback response frames and unsolicited fast link adaptation feedback response frames.

FIG. 11 first shows a message 1110. The message 1110 may include an HT control field, for example, an HT control field that includes one or more fields of the HT control field 900, discussed above with respect to FIG. 9. The message 1110 may have an MRQ field 906 set to indicate a feedback request. The message 1110 may be transmitted by an access point, such as the access point 502 discussed above. Upon receiving the message 1110, the station may respond with a feedback frame 1120. The feedback frame 1120 may also include an HT control field, such as an HT control field that includes one or more fields of the HT control field 900. The HT control field included in the message 1120 may have an MRQ field 906. The MRQ field 906 in the message 1120 may be set to a zero value to indicate the HT control field includes feedback and is not a request for feedback. Messages 1110 and 1120 demonstrate a solicited fast link adaptation message exchange, where the feedback message 1120 is solicited by the message 1110.

In contrast, message 1130 may be transmitted from a station, such as station 504, to an access point, such as AP 502, without any preceding request message, such as message 1110. Instead, the message 1130 may be transmitted by the station 504 in response to a change in channel quality conditions between the AP 502 and the STA 504. For example, the STA 504 may detect an increased level of interface between the AP 502 and the STA 504. As a result, the STA 504 may transmit the unsolicited feedback message 1130. The feedback message 1130 may also include one or more fields of the exemplary HT control field 900, discussed above with respect to FIG. 9.

After receiving one or more of the solicited feedback message 1120, and/or the unsolicited feedback message 1130, the access point 502 may adjust one or more communication parameters for the station 504 based on the message(s). For example, in some aspects, the station may indicate a preference for certain communication parameters, such as a particular resource unit or use of dual carrier modulation. Upon receiving these indications, the access point may adjust communication parameters, such as parameters controlling an uplink transmission from the station 504, to accommodate one or more preferences indicated by the station 504. In some aspects, the station may indicate an amount of power headroom available to the station and/or whether the station is using a minimum transmit power. Upon receiving these indications, the access point may adjust communication parameters used to communicate with the station. For example, in some aspects, the access point may determine a target received signal strength for the station 504 based on the power headroom available to the station, and/or the indication of whether the station 504 is using a minimum transmit power. For example, the access point 502 may determine a lower bound of a received signal strength target for the station 504 based on the indication of whether the station 504 is already at its minimum transmission power. If the AP 502 is aware of the power headroom available to the station, the AP may further adjust the target RSSI based on the stations power headroom. For example, an upper bound on the target RSSI may be based, in some aspects, on the indication of power headroom received from the station 504.

Figure 12:
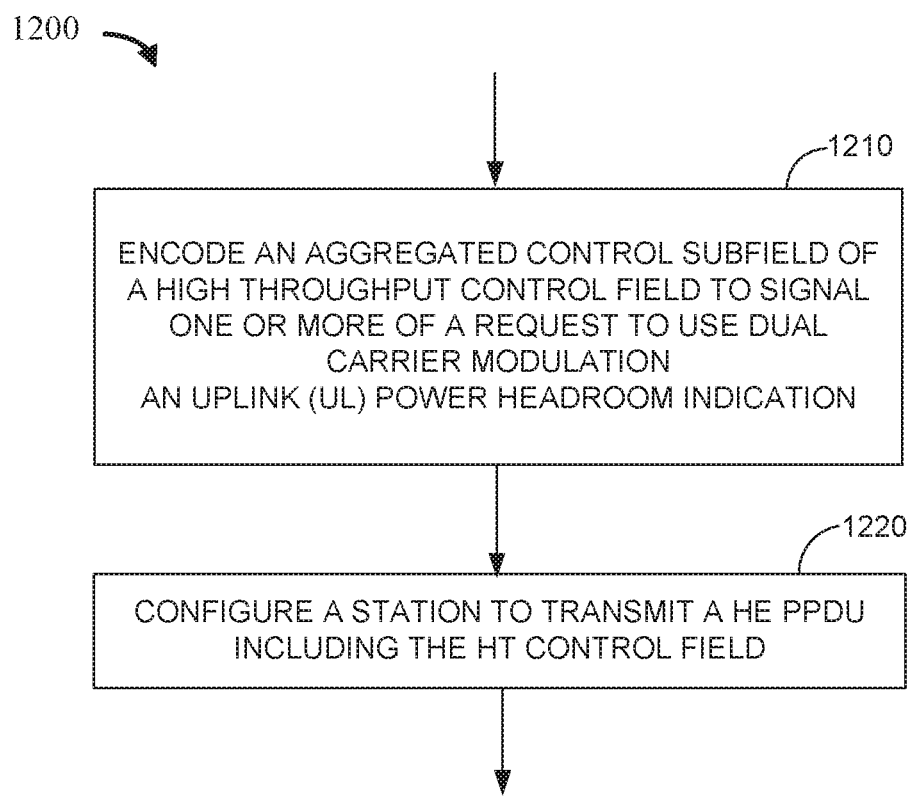
FIG. 12 is a flowchart of an example method for encoding a frame.

FIG. 12 is a flowchart of an example method for encoding a frame. In some aspects, one or more of the functions discussed below with respect to process 1200 and FIG. 12 may be performed by the application processor 111. In some other aspects, one or more of the functions discussed below with respect to FIG. 12 may be performed by the control logic 406. To improve clarity of the description, a device performing process 1200 may be referred to below as an executing device. In some aspects, the executing device is a high efficiency station.

In block 1210, an aggregated control subfield of a high throughput control field is encoded. In some aspects, the aggregated control subfield consists of bits 2-31 of the HT control field. The field is encoded to signal one or more of a request to use dual carrier modulation and an uplink power headroom indication. For example, as discussed above, the HT control field 818 may be included in the frame 800. The HT control field may be formatted in a variety of formats, such as any of formats 830a-c shown in FIG. 8. In one aspect, bit zero (0) of the HT control field may be set to a value of one (1), indicating very high throughput (VHT), for example, as shown in format 830c. In these aspects, bit one (1) of the HT control field may also be set to a one (1), indicating high efficiency (HE), again as shown in format 830c. The aggregated control field 832 may then be encoded as described above in some aspects.

For example, in some aspects, one or more of the fields shown in FIG. 9 may be included in the aggregated control field 832. For example, the aggregated control field 832 may include a dual carrier modulation field 914. The dual carrier modulation field 914 may indicate a request by the executing device to use dual carrier modulation for communication. In some aspects, the dual carrier modulation field 914 is a single bit long. In some aspects, if the dual carrier modulation field 914 is set to a value of one (1), this may indicate the request for use of dual carrier modulation. If the field 914 is set to a value of zero (0), this may indicate that dual carrier modulation is not requested.

In some aspects, the power headroom field 922 may be encoded to indicate the uplink power headroom indication. In some aspects, the power headroom field 922 consists of a plurality of bits. In some aspects, a transmit power headroom available to the executing device may be indicated in the power headroom field 922 in some aspects. In some aspects, the power headroom indication is based on a transmission power of a PLCP protocol data unit (PPDU) including the high throughput control field. For example, the headroom may be a maximum transmit power available to the executing device for a current MCS (e.g., a maximum transmit power of a transmitter hardware component such as the transmit baseband processor 404) minus the transmit power of the PPDU using the current MCS.

In some aspects, the aggregated control subfield is encoded to signal that the executing device is using a minimum transmit power for a current modulation and coding scheme (MCS). For example, in some aspects, a transmission power for a PPDU including the HT control field may be determined based on one or more parameters. For example, in some aspects, the executing device may determine a path loss between the executing device and an access point to which the PPDU will be sent. The executing device may also determine a target received signal strength indication at the access point for the PPDU. Based on these parameters, a transmit power may be determined that, based on the path loss, provides the PPDU at the access point at the target RSSI. In some cases, this determined transmission power may be a minimum transmit power for transmit hardware included with the executing device. For example, in some aspects, the transmission power may be a minimum transmit power for baseband hardware 108 and/or baseband hardware 404 in some aspects. In some aspects, the minimum transmit power indication may be included in the minimum power indication field 924, discussed above with respect to FIG. 9.

Some aspects of block 1210 include receiving a message requesting fast link adaptation feedback data. For example, as discussed above with respect to FIG. 11, in some aspects, a message 1110 may precede transmission of a message 1120. In these aspects, the encoding of the HT control field in block 1210 may be in response to reception of the message requesting fast link adaptation feedback data. In these aspects, the HT control field may be encoded to indicate the feedback being provided is solicited. As such, in some aspects, an MRQ field in the HT control field, such as MRQ field 906 discussed above with respect to FIG. 9, may be set to a predetermined value indicating the feedback is solicited. In some aspects, this predetermined value is one (1).

In some aspects, the executing device may detect a change in channel conditions between an AP and the executing device. For example, in some aspects, the executing device may determine that an interference level between the AP and the executing device has transgressed a threshold. The HT control field may be encoded in some aspects in response to this determination. In these aspects, no particular message may be received by the executing device to cause the HT control field to be encoded. In these aspects, an MRQ field, such as MRQ field 906, may be set to indicate the feedback is being provided in an unsolicited manner. In some aspects, a clear (i.e. value is zero (0)) indicates an unsolicited fast link adaptation feedback message.

In block 1220, the executing device is configured to transmit a high efficiency PLCP protocol data unit (PPDU) including the high throughput (HT) control field. In some aspects, the PPDU forms a fast link adaptation feedback message. Some aspects of block 1220 include the application processor 111 transferring data defining the PPDU to baseband processing circuitry 108. In some aspects, block 1220 may include the control logic 406 transferring data defining the PPDU to the transmit baseband processor 404.

As discussed above, for example with respect to FIG. 11, the high throughout control field may be configured to cause an access point to adjust one or more communication parameters used for communicating with the executing device (e.g. high efficiency station). For example, as discussed above with respect to FIG. 11, the AP may adjust one or more of a target received signal strength indication, an uplink transmission resource unit assignment of the executing device, use of dual carrier modulation for communication between the access point and the executing device based on one or more of the signals encoded in the aggregated control subfield as discussed above. In some embodiments, how an access point may adapt communication parameters based on receiving the high throughput control field encoded by process 1200 described above, is further described below with respect to FIG. 13.

Figure 13:
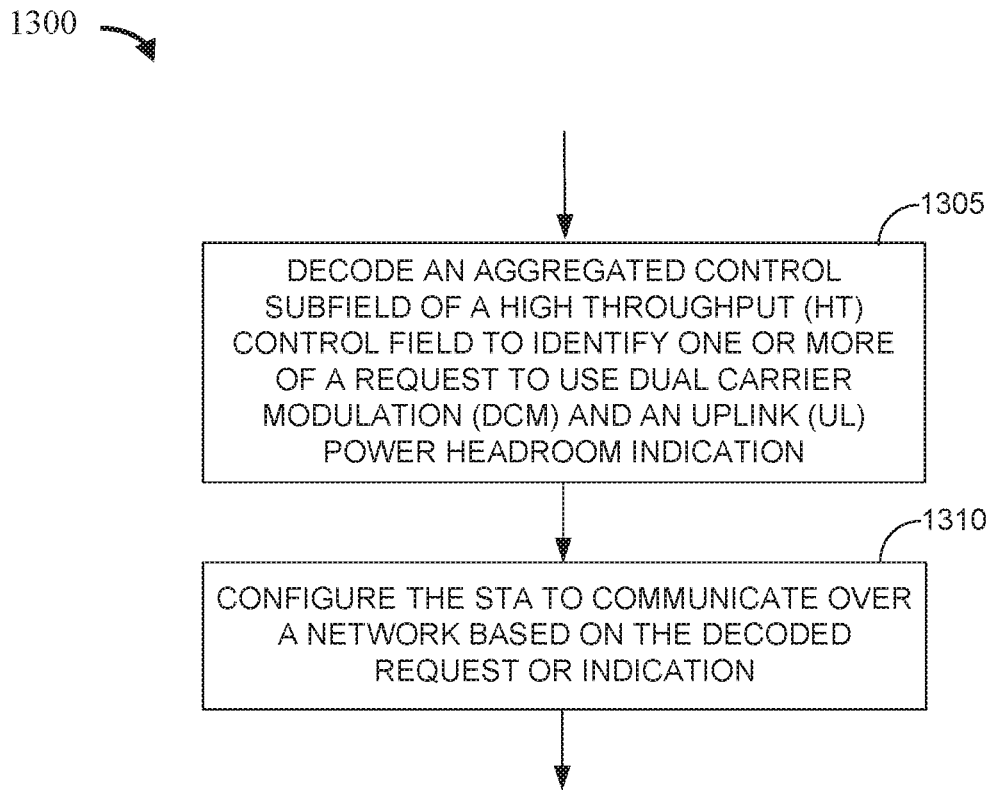
FIG. 13 is a flowchart of a method for receiving fast link adaptation feedback data.

FIG. 13 is a flowchart of a method for receiving fast link adaptation feedback data. In some aspects, one or more of the functions of process 1300, discussed below with respect to FIG. 13, may be performed by the application processor 111. In some aspects, one or more of the functions of process 1300, discussed below with respect to FIG. 13, may be performed by the control logic 406. A device performing process 1300 may be referred to below as an executing device.

In block 1305, an aggregated control subfield of a high throughput control field is decoded to identify one or more of a request to use dual carrier modulation (DCM) and an uplink power headroom indication. In some aspects, the high throughput control field is received from a station by the executing device.

In some aspects of block 1305, the high throughput control field is decoded to determine whether the station is operating at its minimum transmit power. For example, in some aspects, block 1305 may decode the minimum power indication field 924, discussed above with respect to FIG. 9, to make the determination. In some aspects, the determination may effect one or more of a target received signal strength indication for the station or a modulation and coding scheme for the station. For example, if a station is already operating at its minimum transmit power, the executing device (e.g. AP) may lower a modulation and coding scheme assigned to the station in order to reduce the RSSI of the station or if the AP doesn't lower the station's modulation and coding scheme, the AP can group the stations with similar RSSI to transmit simultaneously, such that the near-far problem between different stations can be avoided. Alternatively, if the station is not already operating at its minimum transmit power, the executing device may maintain an MCS assigned to the station and lower the RSSI target for the station.

In block 1310, the executing device is configured to communicate over a network based on the decoded request or the indication. In some aspects, if the aggregated control subfield indicates that DCM is requested, the executing device is configured to use DCM when communicating with the station. In some aspects, a target received signal strength indication and/or a modulation and coding scheme may be selected for the station based on the power headroom indication. For example, a lower MCS may be specified if a device has a relatively lower amount of power headroom, which a larger amount of power headroom may indicate a capacity of the device to support a higher MCS. The executing device may be configured to transmit the determined target RSSI and/or MCS back to the station in a second message.

Example 1 is an apparatus of a high efficiency (HE) station (STA) (HE STA) comprising memory; and processing circuitry coupled to the memory, the processing circuity configured to: encode an aggregated control subfield of a high throughput (HT) Control field to signal one or more of: a request to use dual carrier modulation (DCM), a request to use a particular resource unit, an uplink (UL) power headroom indication, and an indication that the HE STA is using a minimum transmit power for a current modulation and coding scheme (MCS), and configure the HE STA to transmit a HE-PPDU including the HT control field.

In Example 2, the subject matter of Example 1 optionally includes wherein the aggregated control subfield consists of a finite number of bits, and the processing circuitry is further configured to limit the signaling encoded in the aggregated control subfield by the finite number of bits.

In Example 3, the subject matter of any one or more of Examples 1-2 optionally include processing circuitry configured to indicate the HT Control field is a HE variant HT Control field by setting a combination of a bit zero (0) of the HT control field to a second predetermined value to indicate HE.

In Example 4, the subject matter of any one or more of Examples 1-3 optionally include the aggregated control subfield consisting of bits 2-31 of the HT Control field.

In Example 5, the subject matter of any one or more of Examples 3-4 optionally include wherein the first predetermined value is one (1) and the second predetermined value is one (1).

In Example 6, the subject matter of any one or more of Examples 1-5 optionally include wherein the processing circuitry is further configured to set a single bit of the aggregated control subfield to signal the request to use DCM.

In Example 7, the subject matter of any one or more of Examples 1-6 optionally include processing circuitry configured to set a plurality of bits of the aggregated control subfield to signal the UL power headroom indication.

In Example 8, the subject matter of any one or more of Examples 1-7 optionally include processing circuitry configured to encode the aggregated control subfield of a high throughput (HT) Control field to signal a disfavored resource unit.

In Example 9, the subject matter of any one or more of Examples 1-8 optionally include wherein the processing circuitry is further configured to: determine levels of interference present on a plurality of resource units; select the particular resource unit based on the determined levels of interference.

Example 10 is a method for a high efficiency (HE) station (STA) (HE STA), the method comprising: encoding an aggregated control subfield of a high throughput (HT) Control field to signal one or more of: a request to use dual carrier modulation (DCM), and a request to use a particular resource unit, an uplink (UL) power headroom indication, and an indication that the HE STA is using a minimum transmit power for a current modulation and coding scheme (MCS); and configuring the HE STA to transmit a HE-PPDU including the HT control field.

In Example 11, the subject matter of Example 10 optionally includes indicating the HT Control field is a HE variant HT Control field by setting a combination of a bit zero (0) of the HT control field to a first predetermined value to indicate Very High Throughput (VHT) and set a bit one (1) of the HT control field to a second predetermined value to indicate HE.

In Example 12, the subject matter of any one or more of Examples 10-11 optionally include wherein the aggregated control subfield consists of bits 2-31 of the HT Control field.

In Example 13, the subject matter of any one or more of Examples 11-12 optionally wherein the first predetermined value is one (1) and the second predetermined value is one (1).

In Example 14, the subject matter of any one or more of Examples 10-13 optionally include setting a single bit of the aggregated control subfield to signal the request to use DCM.

Example 15 is a non-transitory computer readable storage medium comprising instructions that when executed cause one or more hardware processors to configure a first station to: encode an aggregated control subfield of a high throughput (HT) Control field to signal one or more of: a request to use dual carrier modulation (DCM), a request to use a particular resource unit, an uplink (UL) power headroom indication, and an indication that the HE STA is using a minimum transmit power for a current modulation and coding scheme (MCS); and configure the HE STA to transmit a HE-PPDU including the HT control field.

Example 16 is an apparatus of a high efficiency (HE) station (STA) (HE STA) comprising memory; and processing circuitry coupled to the memory, the processing circuitry configured to: decode an aggregated control subfield of a high throughput (HT) control field to identify one or more of: a request to use dual carrier modulation (DCM), a request to use a particular resource unit, an uplink (UL) power headroom indication, and an indication that the high throughput (HT) Control field was transmitted using a minimum transmission power for a current modulation and coding scheme (MCS); and communicate over a network based on the decoded request or indication.

In Example 17, the subject matter of Example 16 optionally includes wherein the processing circuity is configured to: encode a message using dual carrier modulation (DCM) in response to the decoded request; and configure the HE STA to transmit the network message.

In Example 18, the subject matter of any one or more of Examples 16-17 optionally include wherein the processing circuitry is configured to: determine a target received signal strength (RSSI) or target modulation and coding scheme (MCS) based on the power headroom indication or the minimum transmission power indication; and configure the HE STA to transmit a network message indicating the target RSSI or the target MCS.

In Example 19, the subject matter of Example 18 optionally includes wherein the processing circuitry is further configured to: decode the aggregated control subfield of the high throughput (HT) Control field to determine whether the STA is using a minimum transmit power for a current modulation and coding scheme, and determine an adjustment to the target received signal strength (RSSI) and an adjustment to the target modulation and coding scheme based on whether the HT control field was transmitted using the minimum transmit power.

In Example 20, the subject matter of any one or more of Examples 18-19 optionally include wherein the processing circuitry is further configured to: decode the aggregated control subfield of the high throughput (HT) Control field to determine whether the HT control field was transmitted by a second STA using a minimum transmit power for a current modulation and coding scheme, and determine a received signal strength indication for the second STA; determine a second received signal strength indication for a third STA; and schedule a transmission of the second STA to be concurrent with a transmission of the third STA in response to the second STA indicating it is using the minimum transmit power and the first and second received signal strength indications being within a predetermined range of each other.

Example 21 is a method for a high efficiency (HE) station (STA) (HE STA), the method comprising: decoding an aggregated control subfield of a high throughput (HT) Control field to identify one or more of: a request to use dual carrier modulation (DCM), a request to use a particular resource unit, an uplink (UL) power headroom indication, and an indication that the high throughput (HT) Control field was transmitted using a minimum transmission power for a current modulation and coding scheme (MCS); and configuring the HE STA to communicate over a network based on the decoded request or indication.

In Example 22, the subject matter of Example 21 optionally includes encoding a message using dual carrier modulation (DCM) in response to the decoded request; and configuring the HE STA to transmit the network message.

In Example 23, the subject matter of any one or more of Examples 21-22 optionally include determining a target received signal strength (RSSI) or a target modulation and coding scheme (MCS) based on the power headroom indication or the minimum transmission power indication; and configuring the HE STA to transmit a network message indicating the target RSSI or the target modulation and coding scheme.

In Example 24, the subject matter of Example 23 optionally includes decoding the aggregated control subfield of the high throughput (HT) Control field to determine whether the STA is using a minimum transmit power for a current modulation and coding scheme; and determining an adjustment to the target received signal strength (RSSI) and an adjustment to the target modulation and coding scheme based on the decoded indication.

Example 25 is an apparatus of a high efficiency (HE) station (STA) (HE STA) comprising: means for encoding an aggregated control subfield of a high throughput (HT) Control field to signal one or more of: a request to use dual carrier modulation (DCM), a request to use a particular resource unit, an uplink (UL) power headroom indication, and an indication that the HE STA is using a minimum transmit power for a current modulation and coding scheme (MCS); and means for configuring the HE STA to transmit a HE-PPDU including the HT control field.

In Example 26, the subject matter of Example 25 optionally includes wherein the aggregated control subfield consists of a finite number of bits, and the means for encoding is further configured to limit the signaling encoded in the aggregated control subfield by the finite number of bits.

In Example 27, the subject matter of any one or more of Examples 25-26 optionally include wherein the means for encoding is further configured to indicate the HT Control field is a HE variant HT Control field by setting a combination of a bit zero (0) of the HT control field to a first predetermined value to indicate Very High Throughput (VHT) and set a bit one (1) of the HT control field to a second predetermined value to indicate HE.

In Example 28, the subject matter of any one or more of Examples 25-27 optionally include wherein the aggregated control subfield consists of bits 2-31 of the HT Control field.

In Example 29, the subject matter of any one or more of Examples 3-28 optionally include wherein the first predetermined value is one (1) and the second predetermined value is one (1).

In Example 30, the subject matter of any one or more of Examples 25-29 optionally include Wherein the means for encoding is further configured to set a single bit of the aggregated control subfield to signal the request to use DCM.

In Example 31, the subject matter of any one or more of Examples 25-30 optionally include wherein the means for encoding is further configured to set a plurality of bits of the aggregated control subfield to signal the UL power headroom indication.

In Example 32, the subject matter of any one or more of Examples 25-31 optionally include wherein the means for encoding is further configured to encode the aggregated control subfield of a high throughput (HT) Control field to signal a disfavored resource unit.

In Example 33, the subject matter of any one or more of Examples 25-32 optionally include means for determining levels of interference present on a plurality of resource units; means for selecting the particular resource unit based on the determined levels of interference.

Example 34 is an apparatus of a high efficiency (HE) station (STA) (HE STA), the apparatus comprising: means for decoding an aggregated control subfield of a high throughput (HT) Control field to identify one or more of: a request to use dual carrier modulation (DCM), a request to use a particular resource unit, an uplink (UL) power headroom indication, an indication that the high throughput (HT) Control field was transmitted using a minimum transmission power for a current modulation and coding scheme (MCS); and means for configuring the HE STA to communicate over a network based on the decoded request or indication.

In Example 35, the subject matter of Example 34 optionally includes means for encoding a message using dual carrier modulation (DCM) in response to the decoded request; and means for configuring the HE STA to transmit the network message.

In Example 36, the subject matter of any one or more of Examples 34-35 optionally include means for determining a target received signal strength (RSSI) or a target modulation and coding scheme (MCS) based on the power headroom indication or the minimum transmission power indication; and means for configuring the HE STA to transmit a network message indicating the target RSSI or the target modulation and coding scheme.

In Example 37, the subject matter of any one or more of Examples 34-36 optionally include means for decoding the aggregated control subfield of the high throughput (HT) Control field to determine whether the STA is using a minimum transmit power for a current modulation and coding scheme; and means for determining an adjustment to the target received signal strength (RSSI) and an adjustment to the target modulation and coding scheme based on the decoded indication.

In Example 38, the subject matter of any one or more of Examples 34-37 optionally include means for decoding the aggregated control subfield of the high throughput (HT) Control field to determine whether the HT control field was transmitted by a second STA using a minimum transmit power for a current modulation and coding scheme, and means for determining a received signal strength indication for the second STA; means for determining a second received signal strength indication for a third STA; and means for scheduling a transmission of the second STA to be concurrent with a transmission of the third STA in response to the second STA indicating it is using the minimum transmit power and the first and second received signal strength indications being within a predetermined range of each other.

Examples, as described herein, may include, or may operate on, logic or a number of components, modules, or mechanisms. Modules are tangible entities e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

What is claimed is:

1. An apparatus of a high efficiency (HE) station (STA) (HE STA) comprising memory; and
processing circuitry coupled to the memory, the processing circuitry configured to:
encode a HE-PPDU to include a thirty-two (32) bit High Throughput (HT) Control field;
wherein the processing circuitry is to encode the HE-PPDU to indicate that a format of the HT Control field is a Very High Throughput (VHT) variant by setting bit zero (0) the HT Control field to a value of one (1) and setting bit one (1) the HT Control field to a value of zero (0),
wherein the processing circuitry is to encode the HE-PPDU to indicate that the format of the HT Control field is a High Efficiency (HE) variant by setting bit zero (0) the HT Control field to a value of one (1) and setting bit one (1) the HT Control field to a value of zero (1),
wherein when the format of the HT control field is encoded to indicate the VHT variant, bits 2-29 of the HT control field comprise a VHT Control Middle subfield, bit 30 of the HT control field comprises an Access Category (AC) constraint subfield, and bit 31 of the HT control field comprises a RDG/More PPDU subfield, and
wherein when the format of the HT control field is encoded to indicate the HE variant, bits 2-31 of the HT Control field comprise an aggregated control subfield (A-Control subfield),
wherein for HE link adaptation when the format of the HT control field is encoded to indicate the HE variant, the processing circuitry is configured to encode the A-Control subfield to include at least a one-bit MRQ subfield, a three-bit NSS subfield, a four-bit MCS subfield, and a one-bit DCM subfield,
wherein the MRQ subfield indicates whether feedback is requested or being provided;
wherein the DCM subfield is a request by the HE STA for an access point to use dual carrier modulation (DCM) in communication between the HE STA and the access point,
wherein the NSS subfield indicates a recommended number of spatial streams for the communication between the HE STA and the access point,
wherein the MCS subfield indicates a recommended modulation and coding scheme for the communication between the HE STA and the access point, and
wherein the HT control field is further encoded to include a request to the access point, by the HE STA to assign a particular resource unit for use in the communication between the HE STA and the access point; and
configure the HE STA to transmit the HE-PPDU including the HT control field,
wherein the processing circuitry is to configure HE STA to determine levels of interference present on a plurality of resource units within a bandwidth of the HE-PPDU and request the particular resource unit in the aggregated control subfield based on the determined levels of interference, and
wherein the particular resource unit (RU) comprises one of: a 26-subcarrier RU, a 52-subcarrier RU, 106-subcarrier RU, 242-subcarrier RU, 484-subcarrier RU, and a 996-subcarrier RU.

2. The apparatus of claim 1, wherein the processing circuitry is further configured to set a plurality of bits of the aggregated control subfield to signal a UL power headroom indication.

3. The apparatus of claim 1, wherein the processing circuitry is further configured to encode the aggregated control subfield of the HT Control field to signal a resource unit the HE STA requests that the access point not assign for use in communication between the HE STA and the access point.

4. A non-transitory computer-readable storage medium that stores instructions for execution by processing circuitry of a high efficiency (HE) station (STA) (HE STA), the processing circuitry configured to:
encode a HE-PPDU to include a thirty-two (32) bit High Throughput (HT) Control field;
wherein the processing circuitry is to encode the HE-PPDU to indicate that a format of the HT Control field is a Very High Throughput (VHT) variant by setting bit zero (0) the HT Control field to a value of one (1) and setting bit one (1) the HT Control field to a value of zero (0),
wherein the processing circuitry is to encode the HE-PPDU to indicate that the format of the HT Control field is a High Efficiency (HE) variant by setting bit zero (0) the HT Control field to a value of one (1) and setting bit one (1) the HT Control field to a value of zero (1),
wherein when the format of the HT control field is encoded to indicate the VHT variant, bits 2-29 of the HT control field comprise a VHT Control Middle subfield, bit 30 of the HT control field comprises an Access Category (AC) constraint subfield, and bit 31 of the HT control field comprises a RDG/More PPDU subfield, and
wherein when the format of the HT control field is encoded to indicate the HE variant, bits 2-31 of the HT Control field comprise an aggregated control subfield (A-Control subfield)
wherein for HE link adaptation when the format of the HT control field is encoded to indicate the HE variant, the processing circuitry is configured to encode the A-Control subfield to include at least a one-bit MRQ subfield, a three-bit NSS subfield, a four-bit MCS subfield, and a one-bit DCM subfield,
wherein the MRQ subfield indicates whether feedback is requested or being provided;
wherein the DCM subfield is a request by the HE STA for an access point to use dual carrier modulation (DCM) in communication between the HE STA and the access point,
wherein the NSS subfield indicates a recommended number of spatial streams for the communication between the HE STA and the access point;
wherein the MCS subfield indicates a recommended modulation and coding scheme for the communication between the HE STA and the access point, and
wherein the HT control field is further encoded to include a request to the access point, by the HE STA to assign a particular resource unit for use in the communication between the HE STA and the access point; and
configure the HE STA to transmit the HE-PPDU including the HT control field,
wherein the processing circuitry is to configure HE STA to determine levels of interference present on a plurality of resource units within a bandwidth of the HE- PPDU and request the particular resource unit in the aggregated control subfield based on the determined levels of interference, and wherein the particular resource unit (RU) comprises one of: a 26-subcarrier RU, a 52-subcarrier RU, 106-subcarrier RU, 242-subcarrier RU, 484-subcarrier RU, and a 996-subcarrier RU.

\* \* \* \* \*

UNITED STATES PATENT AND TRADEMARK OFFICE
CERTIFICATE OF CORRECTION

PATENT NO. : 11,251,901 B2
APPLICATION NO. : 16/461692
DATED : February 15, 2022
INVENTOR(S) : Alpert et al.

It is certified that error appears in the above-identified patent and that said Letters Patent is hereby corrected as shown below:

On the Title Page

In item (72), in "Inventors", in Column 1, Line 1, delete "Hasharoni" and insert --Hasharon-- therefor In the Claims In Column 29, Line 22, in Claim 1, delete "(1)," and insert --(0),-- therefor In Column 29, Line 48, in Claim 1, delete "point," and insert --point;-- therefor In Column 30, Line 29, in Claim 4, delete "(1)," and insert --(0),-- therefor Signed and Sealed this
Seventeenth Day of May, 2022

Katherine Kelly Vidal
*Director of the United States Patent and Trademark Office*